US006987371B2

(12) United States Patent
Kifuku (10) Patent No.: US 6,987,371 B2
(45) Date of Patent: Jan. 17, 2006

(54) STEERING CONTROLLING DEVICE (75) Inventor: Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 327 days.

(21) Appl. No.: 09/962,136

(22) Filed: Sep. 26, 2001

(65) Prior Publication Data
US 2003/0011334 A1 Jan. 16, 2003

(30) Foreign Application Priority Data
Jul. 10, 2001 (JP) .................................. 2001-209267

(51) Int. Cl.
H02P 7/00 (2006.01)

(52) U.S. Cl. ..................... 318/432; 318/139; 318/434; 180/443; 180/444; 180/446; 701/41; 701/42; 701/43; 701/44

(58) Field of Classification Search ................. 180/65, 180/444, 79.1, 443, 446; 701/36, 43, 44, 701/41, 42; 318/700–800, 139, 432, 434
See application file for complete search history.

(56) References Cited

U.S. PATENT DOCUMENTS

| 4,212,429 | A | * | 7/1980 | Cuvelier et al. ............... 241/26 |
| 4,666,011 | A | | 5/1987 | Ohe et al. |
| 4,686,438 | A | | 8/1987 | Ohe et al. |
| 4,719,396 | A | | 1/1988 | Shimizu |
| 4,751,978 | A | * | 6/1988 | Drutchas et al. ............ 180/142 |
| 4,837,692 | A | | 6/1989 | Shimizu |
| 4,875,539 | A | * | 10/1989 | Abukawa et al. ........... 180/79.1 |
| 5,040,121 | A | * | 8/1991 | Etoh et al. ............. 364/426.04 |
| 5,202,830 | A | * | 4/1993 | Tsurumiya et al. ..... 364/424.05 |
| 5,758,741 | A | * | 6/1998 | Tomioka ..................... 180/446 |
| 5,847,534 | A | * | 12/1998 | Tanamachi et al. ......... 318/201 |
| 6,026,926 | A | * | 2/2000 | Noro et al. ................. 180/446 |
| 6,502,024 | B2 | * | 12/2002 | Ishihara et al. ............... 701/41 |

FOREIGN PATENT DOCUMENTS

| DE | 37 11 099 C2 | | 10/1988 |
| EP | 0361726 A2 | | 4/1990 |
| JP | 7-76280 | | 3/1995 |
| JP | 11-89283 | | 3/1999 |
| JP | 2000-78888 | | 3/2000 |
| JP | 2001-260907 | * | 9/2001 |
| JP | 2003-33077 | * | 1/2003 |

OTHER PUBLICATIONS

French Search Report dated Nov. 5, 2004.

* cited by examiner

Primary Examiner—David Martin
Assistant Examiner—Tyrone Smith
(74) Attorney, Agent, or Firm—Sughrue Mion, PLLC (57) ABSTRACT A steering controlling device comprising a power source, a motor connected to a steering system, a motor driving circuit converting a power source voltage to a predetermined voltage and applying the voltage to the motor, and a controlling means for controlling the motor driving circuit, wherein the controlling means controls the motor driving circuit so as to boost the power source voltage when a rotational speed of the motor is a predetermined value or more, whereby a sufficient motor output torque is obtainable under various steering conditions in use of a converter, an efficiency is improved by suppressing a frequency of operating the converter, and an appropriate fail safe treatment is conducted when the converter is disordered.

17 Claims, 5 Drawing Sheets

STEERING CONTROLLING DEVICE

BACKGROUND OF THE INVENTION

1. Field of the Invention

The present invention relates to a steering controlling device for automobiles and so on.

2. Discussion of Background

Figure 5:
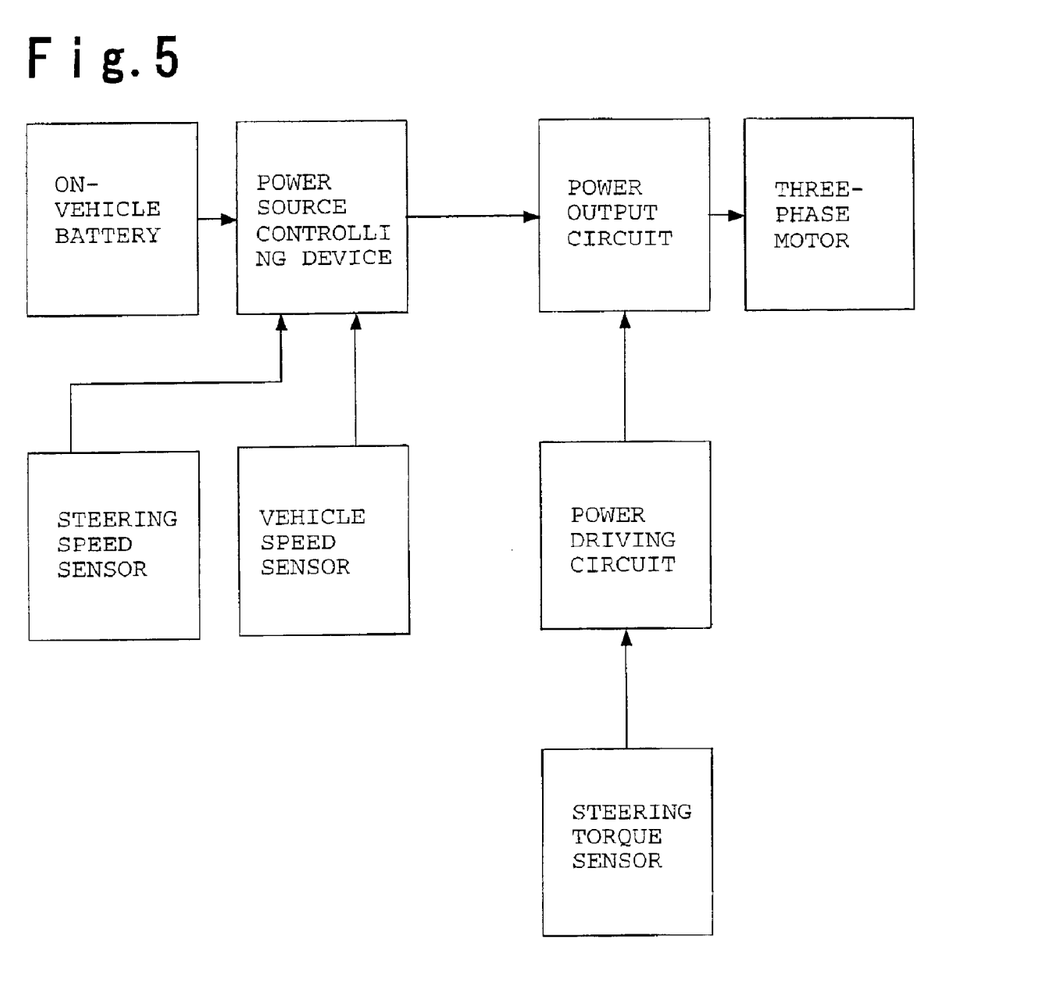
FIG. 5 is a block chart schematically illustrating a conventional steering controlling device.

In a conventional technique, an electric power steering device disclosed in Japanese Unexamined Patent Publication JP-A-7-76280 is known, wherein enhancement of an efficiency of power conversion is aimed. FIG. 5 is a block chart illustrating a structure of a conventional device. In the conventional electric power steering device, when a vehicle speed is low, it is judged that a load of a motor is high, whereby a voltage of power source is boosted, and the motor is driven by the boosted voltage.

However, since the conventional device is constructed as described above, the power source is boosted when a vehicle speed is low, whereby a frequency of using the converter is increased. Therefore, there are serious problems that an efficiency is lowered by a loss in the converter, a fuel consumption of a vehicle is deteriorated by over-discharge of a battery or an increment of generating power, and an effect of an electric power steering system, which is originally aimed to improve the fuel consumption by its high efficiency, is not obtainable.

Further, in the conventional device, failures of the converter are not considered.

SUMMARY OF THE INVENTION

It is an object of the present invention to solve the above-mentioned problems inherent in the conventional technique and to provide a steering controlling device which generates a sufficient output torque of a motor under various steering conditions, suppresses a frequency of operation of a converter, and improves an efficiency, in use of the converter. Another object of the present invention is to enable a fail safe treatment when the converter is disordered.

According to a first aspect of the present invention, there is provided a steering controlling device comprising: a power source; a motor connected to a steering system; a motor driving circuit converting a power source voltage to a predetermined voltage and applying the converted voltage to the motor; and a means for controlling the motor driving circuit, wherein the controlling means controls the motor driving circuit so as to boost the power source voltage when a rotational speed of the motor is a predetermined value or more.

According to a second aspect of the present invention, there is provided the steering controlling device, wherein the controlling means operates the rotational speed of the motor based on an electric current and an impressed voltage of the motor.

According to a third aspect of the present invention, there is provided a steering controlling device comprising: a power source; a motor connected to a steering system; a motor driving circuit converting a power source voltage to a predetermined voltage and applying the converted voltage to the motor; and a means for controlling the motor driving circuit, wherein the controlling means controls the motor driving circuit by controlling an electric current of the motor so as to be a predetermined target value and boosting the power source voltage when the electric current of the motor is lower than the target value so as to drive the motor.

According to a fourth aspect of the present invention, there is provided a steering controlling device comprising: a power source; a motor connected to a steering system; a motor driving circuit converting a power source voltage to a predetermined voltage and applying the converted voltage to the motor; and a means for controlling the motor driving circuit, wherein the controlling means controls the motor driving circuit by controlling an electric current of the motor so as to be a predetermined target value and boosting the power source voltage when an impressed voltage applied to the motor exceeds a predetermined value so as to drive the motor.

According to a fifth aspect of the present invention, there is provided the steering controlling device, wherein the motor driving circuit is controlled to boost the power source voltage in order to drive the motor when a referee condition for boosting the power source voltage is satisfied for a predetermined time or more.

According to a sixth aspect of the present invention, there is provided the steering controlling device, wherein the motor uses a magnetic field by a permanent magnet.

According to a seventh aspect of the present invention, there is provided the steering controlling device, wherein the motor driving circuit includes at least a first converter connected to the power source and a bridge circuit connected to the motor.

According to an eighth aspect of the present invention, there is provided the steering controlling device, further comprising: a second converter boosting an output voltage from the first converter in order to drive switching elements, forming the bridge circuit.

According to a ninth aspect of the present invention, there is provided the steering controlling device, wherein the switching elements on a side of the power source among the switching elements, forming the bridge circuit, are driven by the second converter.

According to a tenth aspect of the present invention, there is provided the steering controlling device, wherein the controlling means monitors at least an input voltage to the first converter.

According to an eleventh aspect of the present invention, there is provided the steering controlling device, wherein the controlling means monitors at least an output voltage from the first converter.

According to a twelfth aspect of the present invention, there is provided the steering controlling device, wherein the controlling means controls an output voltage from the first converter so as to be a predetermined target value.

According to a thirteenth aspect of the present invention, there is provided the steering controlling device, wherein the controlling means controls so that the boosted voltage is a predetermined value or less.

According to a fourteenth aspect of the present invention, there is provided the steering controlling device, wherein the controlling means stops a first boost operation when the first converter is judged abnormal.

According to a fifteenth aspect of the present invention, there is provided the steering controlling device, wherein the controlling means stops an application of a current to the motor when the first converter is judged abnormal.

According to a sixteenth aspect of the present invention, there is provided the steering controlling device, wherein the power source is connected to the motor driving circuit through a switching means, and the controlling means opens a contact point of the switching means when the first converter is judged abnormal.

According to a seventeenth aspect of the present invention, there is provided the steering controlling device, wherein a duty ratio of driving the switching elements of the bridge circuit is 100% when the first converter is operated to boost the voltage.

According to an eighteenth aspect of the present invention, there is provided the steering controlling device, wherein terminals of diodes forming the first converter are short-circuited when the first converter is not operated to boost the voltage.

According to a nineteenth aspect of the present invention, there is provided the steering controlling device, wherein the diodes forming the first converter are parasitic diodes of MOSFET.

According to a twentieth aspect of the present invention, there is provided the steering controlling device, wherein the controlling means controls the electric current of the motor so as to be a predetermined target value by driving at least one of the first converter and the bridge circuit by pulse.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIGS. 1 through 4 as follows, wherein the same numerical references are used for the same or similar portions and descriptions of these portions is omitted.

Embodiment 1

Figure 1:
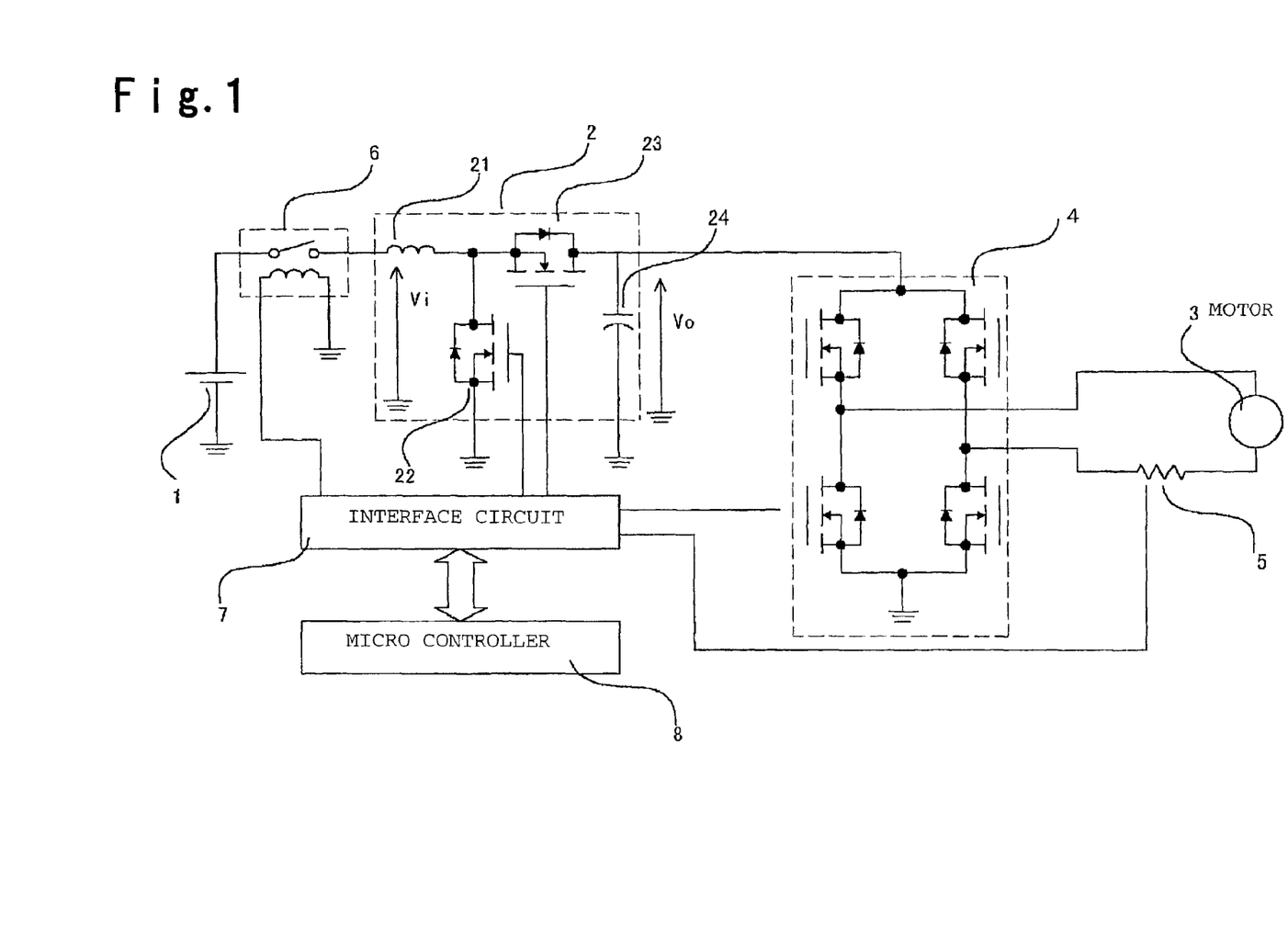
FIG. 1 is a block chart schematically illustrating a steering controlling device according to Embodiment 1 of the present invention.

FIG. 1 illustrates an embodiment of the present invention. Numerical reference 1 designates a battery; and numerical reference 2 designates a first converter for boosting a voltage of the battery 1, the first converter is formed by a choke coil 21, a first switching element 22, a second switching element 23, and a capacitor 24. Numerical reference 3 designates a motor connected to a steering system (not shown), the motor is a d.c. motor using a magnetic field by a permanent magnet. Numerical reference 4 designates a bridge circuit for reversibly driving the motor 3; numerical reference 5 designates a motor current detecting circuit for detecting a current of the motor 3; numerical reference 6 designates a relay for allowing or prohibiting a supply of an electric current to the first converter 2 or the bridge circuit 4; and numerical reference 7 designates an interface circuit for connecting the above-mentioned various circuits to a micro controller 8.

Figure 2:
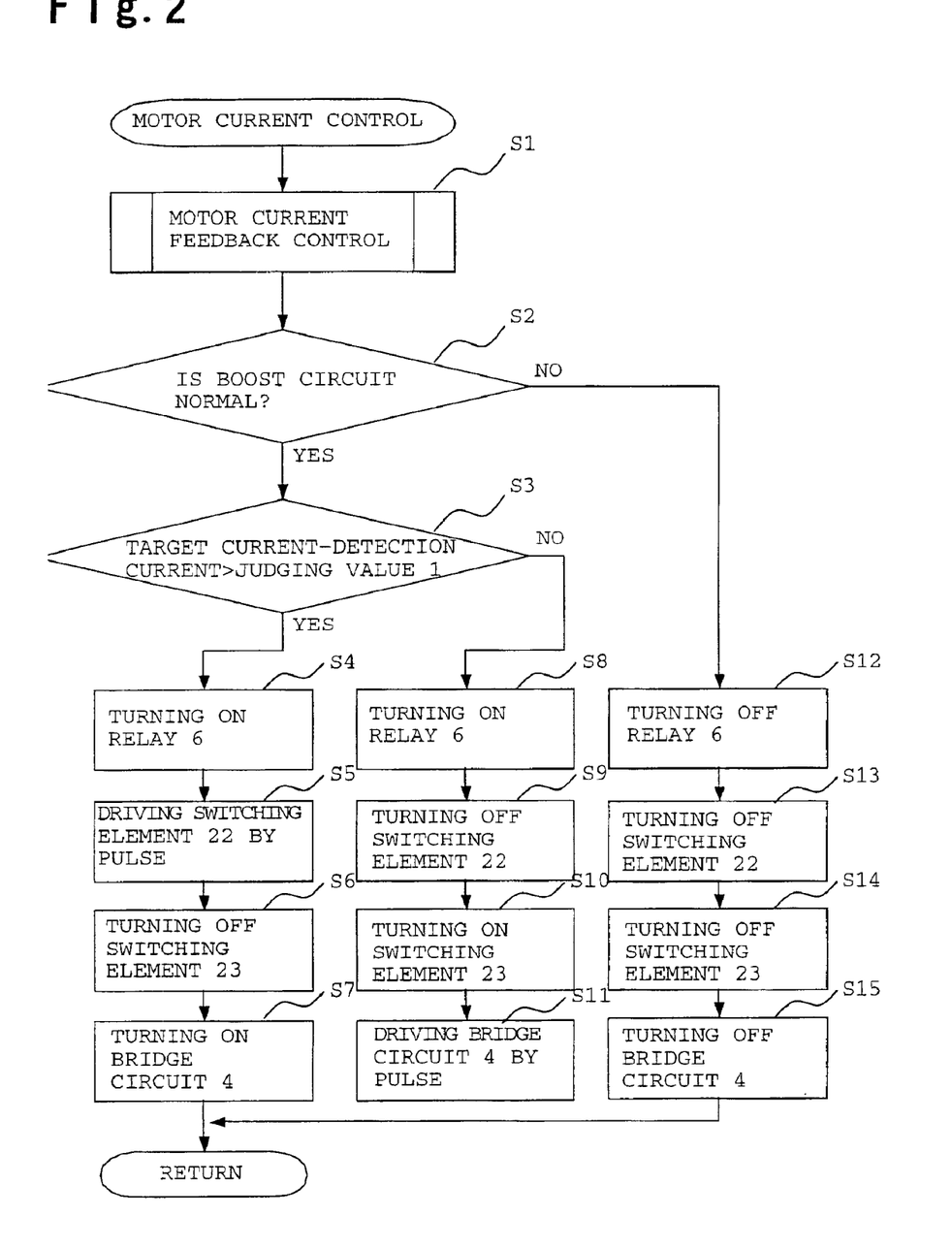
FIG. 2 is a flow chart illustrating an operation of the steering controlling device according to Embodiment 1 of the present invention.

The motor 3 is appropriately controlled by the micro controller 8 depending on steering conditions by a driver. Hereinbelow, an operation of the micro controller 8 will be described in reference of the flow chart in FIG. 2. A program in FIG. 2 is stored in an ROM (not shown), built in the micro controller 8, and periodically read out by an upper program.

In Step S1, a motor current is subjected to a feedback control based on a target electric current of the motor, set by a steering torque, a vehicle speed, and so on so that the target electric current is in agreement with a detection electric current by the motor current detecting circuit 5 in accordance with, for example, an algorithm such as a PI control. This feedback control is known in a conventional technique, and a detailed description is omitted.

In Step S2, by comparing an input voltage Vi of the first converter 2 with an output voltage Vo of the first converter 2, a failure of the first converter 2 is judged. For example, when Vo is lower than Vi, a short-circuit of the first switching element 22 and a failure such that the switching element 23 is not turned on are judged.

When the first converter 2 is normal, Step S3 is processed to judge whether or not the steering speed is high. A deviation of the feedback control of the motor current is used to judge the steering speed. When (target value−detection value)>judging value is established, the steering speed is judged high.

Figure 3:
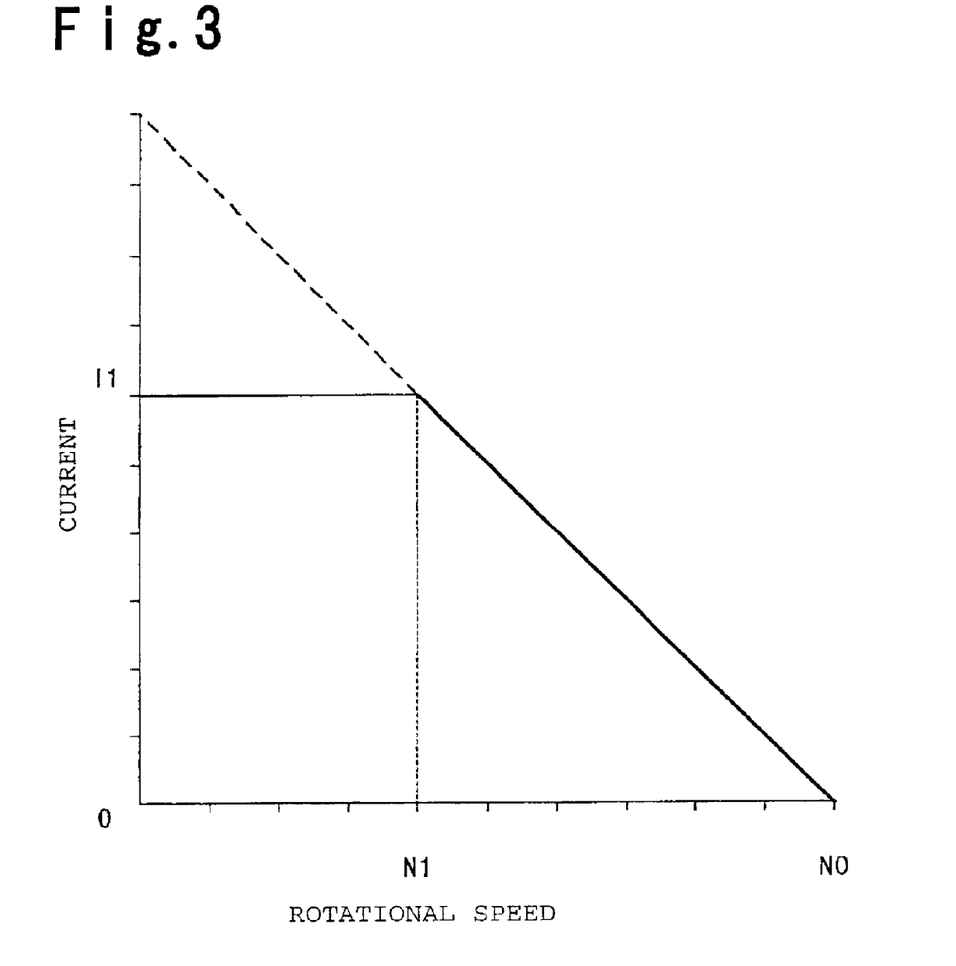
FIG. 3 is a graph explaining characteristics of a motor of the steering controlling device according to Embodiment 1 of the present invention.

The judgment whether or not the steering speed is high will be described in detail. In FIG. 3, a relationship between a rotational speed and an electric current in a case that a power source voltage is constant and the motor current of the d.c. motor using a magnetic field by a magnet is subjected to a feedback control so as to be a constant value I0 is shown. Because a counter-electromotive force by the motor is in proportion to the rotational speed, when the rotational speed exceeds N1, an impressed voltage to the motor is saturated at a voltage substantially the same as the power source voltage, and the motor electric current is reduced as the rotational speed increases. Therefore, when the above deviation between the target value and the detection value is a predetermined judging value or less, the rotational speed of the motor is N1 or more, whereby the steering speed is judged high.

The relationship shown in FIG. 3 is determined by a characteristic of the motor. A motor having a small torque constant puts out a higher idling rotational speed, and a motor having a large torque constant puts out a lower idling rotational speed N0. Further, in order to obtain an identical output torque, the motor having the small torque constant requires a large electric current, and the motor having the large torque constant requires a small electric current.

As described, when the steering speed is high, in other words, a driver quickly steers, the output torque of the motor is decreased by a decrement of the motor current, whereby a steering force by the driver is increased. In order to relax an influence of this phenomenon, a motor having a small torque constant and putting out a higher idling rotational speed N0 may be used. However, in this case, a larger electric current is required to obtain the identical motor output torque, whereby an efficiency is deteriorated.

Accordingly, the motor having the larger torque constant and putting out the smaller idling rotational speed N0 is used, wherein when the steering speed is low, it is necessary to obtain a larger output torque by a smaller electric current, and when the steering speed is high, it is necessary to prevent a drop of the motor current caused by a counter-electromotive force by boosting the power source voltage. Although an efficiency is lowered by a loss in the converter used for boosting the power source voltage, the steering speed is high when the driver quickly steers as described above. In an actual driving condition, a frequency of quick steering is low, and therefore a frequency of operating the converter is low, whereby an efficiency is improved on average under a normal driving condition.

In order to achieve the above-described purposes, in Steps S4 through S7, the first converter 2 is operated when the steering speed is judged high in Step S3. At first, in Step S4, the relay 6 is turned on. Next, the first switching element 22 is driven by pulse in Step S5, and the second switching element 23 is turned off in Step S6. The switching element is an MOSFET, by which a parasitic diode appearing because of its structure rectifies, the first converter 2 is operated as a boosting chopper, and the boosted voltage is stored in the capacitor 24. The boosted voltage is used to drive the motor 3 through the bridge circuit 4 to cancel the counter-electromotive force by the boosted voltage, whereby the deviation of the motor current approaches 0.

In the next, the bridge circuit 4 is turned on in Step S7. As described below, when the steering speed is a predetermined value or less, the motor current is subjected to a feedback control by a so-called PWM drive. However, when the steering speed is judged high in Step S3, the motor current does not reach the target value even though the bridge circuit 4 is driven at a duty ratio of 100%. In this case, the bridge circuit 4 is driven at the duty ratio of 100%. Accordingly, it is possible to render a switching loss of the bridge circuit 4 zero, and an efficiency is further improved.

Succeedingly, Steps S8 through S11 are a process when the steering speed is judged low in Step S3. As described, the motor current is subjected to the feedback control by the PWM drive of the bridge circuit 4.

At first, a relay 6 is turned on in Step S8. Next, in Step S9, the first switching element 22 is turned off, and the second switching element 23 is turned on in Step S10, whereby a loss in the switching element 23 is suppressed. Finally, in Step S11, the bridge circuit 4 is driven by PWM at a predetermined duty ratio. By the above operations, even though the voltage is not boosted, the feedback control of the motor current is achieved while suppressing a loss of the first converter 2.

Finally, Steps S12 through S15 are processed in a case that the first converter 2 is judged to be in failure in Step S2. At first, the relay 6 is turned off in Step S12, whereby it is possible to prevent fire and so on from occurring in a case such that the switching element 22 is disordered by a short circuit. Further, in Step S13, the first switching element 22 is turned off, and the second switching element 23 is turned off in Step S14, whereby the motor 3 is securely turned off. Finally, in Step S15, the bridge circuit 4 is turned off.

Figure 4:
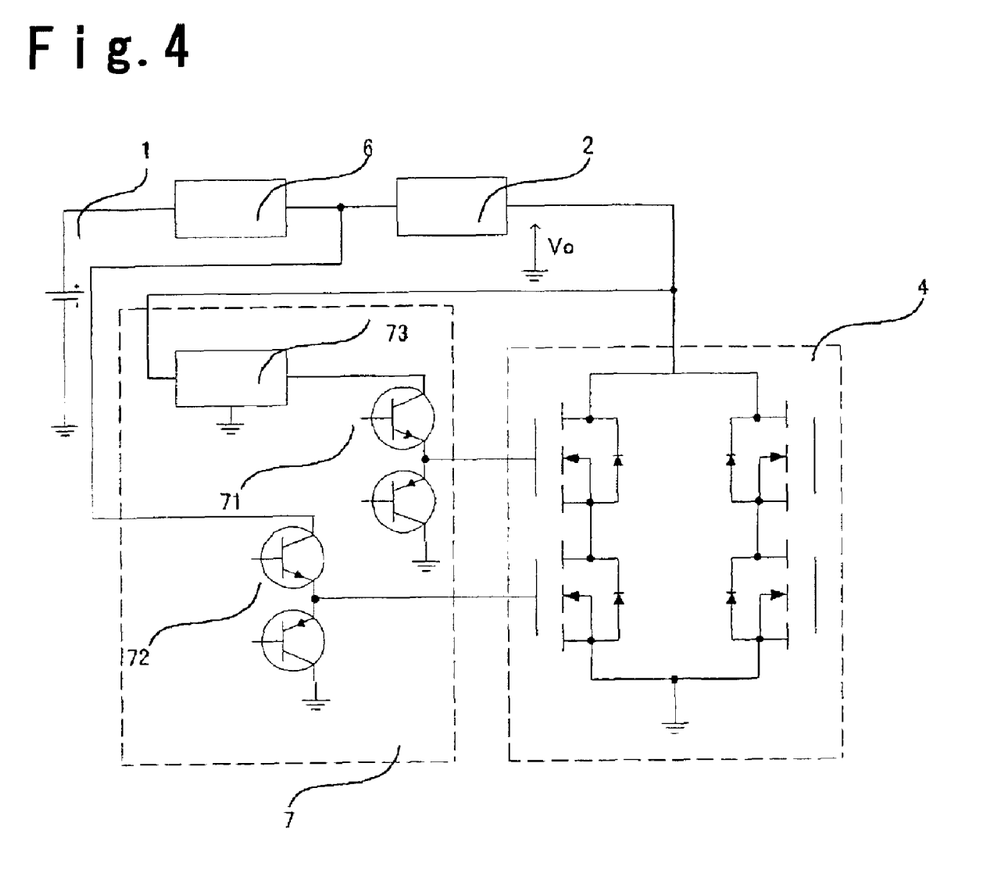
FIG. 4 is a block chart schematically illustrating a motor driving circuit of the steering controlling device according to Embodiment 1 of the present invention.

Next, a driving circuit of the bridge circuit 4 will be described. FIG. 4 illustrates a structure of the driving circuit of the bridge circuit 4. The same numerical references are used for the same portions of FIG. 1, and description of these portions are omitted. Numerical references 71 through 73 designate parts of an interface circuit 7, wherein numerical reference 71 designates a switching element driving circuit on a power source side for driving MOSFET on the power source side, forming the bridge circuit 4; numerical reference 72 designates a switching element driving circuit on a ground side for driving MOSFET on the ground side; and numerical reference 73 designates a second converter, being a power source of the switching element driving circuit on the power source side 71. Although only a driving circuit for a single arm of the bridge circuit 4 is illustrated in FIG. 4, a driving circuit for the other arm is located in a manner similar thereto.

As illustrated in FIG. 4, the bridge circuit 4 is formed by N-channel MOSFET. The MOSFET on the power source side has a source potential equal to an output voltage Vo of the converter 2, wherein it is necessary to apply a voltage higher than Vo to a gate. Accordingly, the output voltage of the first converter 2 is connected to the second converter 73 to boost Vo and is supplied as a power source for the switching element driving circuit on the power source side 71. On the other hand, because the source of the MOSFET on the ground side has a ground potential, the battery 1 is supplied as a power source for the switching element driving circuit on the ground side 72.

By constructing the driving circuit of the bridge circuit 4 as above, it is possible to turn on and off MOSFET forming the bridge circuit 4 with sufficient stability. Further, since the second converter is connected to the MOSFET on the power source side, it is not required to locate any unnecessary converter on the ground side, whereby a system with a high efficiency can be constructed.

As described above, the steering controlling device according to this embodiment generates a sufficient motor output torque even though the steering speed is high and demonstrates a high efficiency. Although the number of elements is reduced and a loss at the time of stopping the boost is reduced using the parasitic diode of the MOSFET as the rectifier diode and turning on and off the MOSFET in response to starting and stopping of the boost, the converter is not limited to this circuit structure, and other structures may demonstrate the above-mentioned effects.

Further, although the boost is immediately started when the deviation of the motor current is the predetermined value or more in the above embodiment, the boost may be started by the first converter 2 when the above condition continues for a predetermined time. In accordance therewith, it is possible to prevent hunting at a time of judging conditions for boosting.

Further, although the boost is started by the first converter 2 when (target value−detection value)>judging value is established and the boost by the first converter 2 is stopped when (target value−detection value)≦judging value is established, a structure that a hysteresis is given to a referee condition and a second judging value smaller than the above judging value, i.e. (target value−detection value) or more, is adopted as a condition for stopping the boost by the first converter 2, may be used. In accordance therewith, it is possible to prevent hunting at the time of judging the boosting condition.

Further, although the PWM duty ratio of the bridge circuit 4 is 100% at the time of starting the boost by the first converter 2, the PWM drive may be continued in response to a result of an operation of the current feedback control S1. In accordance therewith, it is possible to control the motor current with high accuracy when the steering speed is high.

Further, the judging value for judging the steering speed in Step S3 may be changed in response to the power source voltage, the motor current, and so on.

Further, as known from FIG. 3, N1 increases as I1 decreases, and the motor current is not lower than the target value under a further higher steering speed. In other words, as the load of the motor is high and the motor current is large, the motor current is lower than the target value under a further low steering speed, whereby a lack of the output torque from the motor is further conspicuous under a low-speed drive. In accordance therewith, a structure that the judgment whether or not the boost is necessary based on the judgment of the rotational speed may be adopted only under the low-speed drive. In this case, unnecessary operations of the converter during the drive can be suppressed, the loss is further reduced, and a highly efficient system can be constructed.

Further, although the motor is stopped to drive when the first converter 2 is judged to be in failure in Step S2 in the above embodiment, a structure that only the boosting operation is stopped and the motor is continued to be driven may be adopted. Further, when the converter is in failure, it may be possible to alert the driver by a warning lamp or the like.

Further, although any sensor for detecting a steering angle and the rotational speed of the motor is not used, and it is judged whether or not the rotational speed of the motor is high based on the deviation between the target value and the motor current so as to demonstrate effects such as a compactness of the system and a cost reduction in addition to the above-mentioned effects of improving the system efficiency in the above embodiment, a structure that the above sensors are located to judge whether or not the boost is necessary based on a rotational speed obtained from these sensors may be adopted if only an effect of improving a system efficiency, which is the most importance in the present invention.

Embodiment 2

Although the first converter 2 is started and stopped based on only the result of the operation of the motor current feedback control in the above embodiment, the output voltage from the first converter may be set to be a predetermined value by a feedback control to obtain a constant voltage. Accordingly, a voltage after boosting is stabilized, controllability of the motor is further improved, and steering feeling is improved in a power steering device.

Further, the first converter 2 may be driven so that a voltage Vo after boosting is a predetermined value or less. Accordingly, it is possible to protect various circuit, to which the output voltage Vo from the first converter 2 is applied, from a high voltage.

Embodiment 3

Although it is judged whether or not the boosting operation is necessary based on the deviation of the electric current in the above embodiment, necessity of a boosting operation may be judged when an impressed voltage to a motor is a predetermined value or more. In other words, the impressed voltage is high in a case that a motor current feedback control indicates a PWM duty of about 100% by an influence of a counter-electromotive force of the motor. In this case, in order to obtain a desirable motor output torque, it is necessary to further increase the impressed voltage. Therefore, when the impressed voltage is the predetermined value or more, the boosting operation is conducted. In this case, a voltage is boosted before a current deviation is generated, whereby steering feeling can be further improved.

Further, by operating the counter-electromotive force from the impressed voltage and a motor current and judging that a rotational speed is high when the counter-electromotive force is a predetermined value or more, the judgment is further accurate.

The first advantage of the steering controlling device according to the present invention is that because the steering controlling device comprises the power source, the motor connected to the steering system, the motor driving circuit converting the power source voltage to the predetermined voltage and applying the voltage to the motor, and the controlling means for controlling the motor driving circuit, wherein the controlling means controls the motor driving circuit so as to boost the power source voltage when the rotational number of the motor is the predetermined value or more, it is possible to boost the power source voltage only in the case that the torque, generated from the motor, is short by an influence of an counter-electromotive force, generated by a high rotational number of the motor actually requiring a boost of the power source voltage, and therefore the efficiency of the entire device can be improved by reducing the frequency of the boost.

The second advantage of the steering controlling device according to the present invention is that because the controlling means operates the number of revolutions of the motor based on the electric current of the motor and the impressed voltage, it is possible to judge whether or not the rotational speed of the motor is high without specifically locating a rotation sensor and so on, and effects such as compactness of the system and a reduction of the cost can be demonstrated.

The third advantage of the steering controlling device according to the present invention is that because the steering controlling device comprises the power source, the motor connected to the steering system, the motor driving circuit converting the power source voltage to the predetermined voltage and applying the voltage to the motor, and the controlling means for controlling the motor driving circuit, wherein the controlling means controls the electric current of the motor so as to be the predetermined target value and controls the motor driving circuit so as to drive the motor by boosting the power source voltage when the motor current is lower than the target value, it is possible to boost the power source voltage only in the case that the torque generated by the motor is short by an influence of a counter-electromotive force caused by a high rotational number of the motor actually requiring the boost of the power source voltage, an effect of improving the efficiency of the entire device is obtainable by reducing a frequency of the boost, it is possible to judge whether or not the rotational number of the motor is high without specifically locating any rotational sensor and so on, and the effects such as a compactness of the system and a reduction of the cost can be demonstrated.

The fourth advantage of the steering controlling device according to the present invention is that because the steering controlling device comprises the power source, the motor connected to the steering system, the motor driving circuit converting the power source voltage to the predetermined voltage and applying the voltage to the motor, and the controlling means for controlling the motor driving circuit, wherein the controlling means controls the electric current of the motor so as to be the predetermined target value and controls the motor driving circuit so as to drive the motor by boosting the power source voltage when the impressed voltage to the motor is the predetermined value or more, it is possible to boost the power source voltage only in the case that the torque generated by the motor is short by an influence of a counter-electromotive force caused by a high rotational number of the motor actually requiring the boost of the power source voltage, the effect that efficiency of the entire device is improved by reducing the frequency of the boost can be demonstrated, it is possible to judge whether or not the rotational number of the motor is high without specifically locating any rotational sensor and so on, the effects such as a compactness of the system and a reduction of the cost can be demonstrated, and further because the voltage is boosted before a current deviation is generated, it is possible to further improve the steering feeling.

The fifth advantage of the steering controlling device according to the present invention is that because the motor driving circuit is controlled to drive the motor by boosting the power source voltage in the case that the referee condition for boosting the power source voltage continues for the predetermined time or more, it is possible to demonstrate the effect that hunting in judging whether or not the voltage is boosted can be prevented.

The sixth advantage of the steering controlling device according to the present invention is that because the motor uses a magnetic field by the permanent magnet, it is possible to obtain a large output torque by a further small electric current in the case that the steering speed is low, and an effect of improving an efficiency of the entire device can be demonstrated.

The seventh advantage of the steering controlling device according to the present invention is that because the motor driving circuit is formed by at least the first converter connected to the power source voltage and the bridge circuit connected to the motor, an effect that the steering controlling device effecting forward and backward rotations of the motor is easily constructed can be demonstrated.

The eighth advantage of the steering controlling device according to the present invention is that because the second converter for further boosting the output voltage from the first converter in order to drive the switching elements, forming the bridge circuit, is located, an effect of turning on and off the switching element forming the bridge circuit with sufficient stability can be demonstrated.

The ninth advantage of the steering controlling device according to the present invention is that only the switching element on the power source side among the switching elements forming the bridge circuit is driven by the second converter, an effect that the system having a further high efficiency is constructed without locating any unnecessary converter on the ground side can be demonstrated.

The tenth advantage of the steering controlling device according to the present invention is that because the controlling means monitors at least the input voltage of the first converter, an effect that a failure of the first converter is detected and an appropriate treatment such that the first converter is cut off is conducted when the failure occurs can be demonstrated.

The eleventh advantage of the steering controlling device according to the present invention is that because the controlling means monitors at least the output voltage from the first converter, an effects that a failure of the first converter is detected and an appropriate treatment such that the first converter is cut off is conducted when the failure occurs can be demonstrated.

The twelfth advantage of the steering controlling device according to the present invention is that because the controlling means controls the output voltage from the first converter so as to be the predetermined target value, effects that the voltage after the boost is stabilized, controllability of the motor is improved, and the steering feeling of the power steering device is improved can be demonstrated.

The thirteenth advantage of the steering controlling device according to the present invention is that because the controlling means controls the boosted voltage so as to be the predetermined value or less, it is possible to prevent the first converter from generating an unnecessary high voltage, and the bridge circuit and so on, to which the output voltage from the first converter is supplied, can be protected from the generated high voltage.

The fourteenth advantage of the steering controlling device according to the present invention is that because the controlling means stops the first boosting operation when the first converter is judged abnormal, it is possible to prevent the elements forming the first converter from burning, smoking, firing, and so on, accompanied by the burning, can be previously prevented.

The fifteenth advantage of the steering controlling device according to the present invention is that the controlling means stops an application of the electric current to the motor when the first converter is judged abnormal, the appropriate fail safe treatment of stopping the control of the system can be conducted when a failure is caused.

The sixteenth advantage of the steering controlling device according to the present invention is that because the power source is connected to the motor driving circuit through the switching means, and a contact of the switching means is opened when it is judged that the first converter is abnormal, it is possible to previously prevent firing and so on in cases such that the switching element forming the motor driving circuit are short-circuited and disordered.

The seventeenth advantage of the steering controlling device according to the present invention is that because the duty ratio of driving the switching elements of the bridge circuit is 100% in the case that the first converter is operated to boost the voltage, it is possible to render the switching loss of the bridge circuit 0, and the efficiency can be further improved.

The eighteenth advantage of the steering controlling device according to the present invention is that because terminals of the rectifier diodes forming the first converter are shorted in the case that the first converter is not operated to boost the voltage, it is possible to prevent a loss by the elements forming the first converter.

The nineteenth advantage of the steering controlling device according to the present invention is that because the rectifier diodes forming the first converter are the parasitic diodes of MOSFET, the number of the elements can be reduced, and a loss caused at the time of stopping the boost can be reduced.

The twentieth advantage of the steering controlling device according to the present invention is that because the controlling means controls the motor current so as to be the predetermined target value by driving at least one of the first converter and the bridge circuit by pulse, an appropriate current control can be constantly achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A steering controlling device comprising:
   a power source;
   a motor connected to a steering system;
   a motor driving circuit converting a power source voltage to a predetermined voltage and applying the converted voltage to the motor; and
   means for boosting the power source voltage when a difference between (1) a target value of an electric current of the motor and (2) a detected value of the electric current of the motor is greater than a predetermined value.

2. The steering controlling device according to claim 1,
wherein the means for boosting the power source voltage controls the motor driving circuit by controlling an electric current of the motor to be a predetermined target value and boosting the power source voltage when a voltage applied to the motor exceeds a predetermined value to drive the motor.

3. The steering controlling device according to claim 1,
wherein the motor driving circuit is controlled to boost the power source voltage in order to drive the motor when a condition for boosting the power source voltage is satisfied for a predetermined time or more.

4. The steering controlling device according to claim 1,
wherein the motor uses a magnetic field by a permanent magnet.

5. The steering controlling device according to claim 1,
wherein the motor driving circuit includes at least a first converter connected to the power source and a bridge circuit connected to the motor.

6. The steering controlling device according to claim 5, further comprising:
a second converter boosting an output voltage from the first converter in order to drive switching elements, forming the bridge circuit.

7. The steering controlling device according to claim 6,
wherein the switching elements on a side of the power source are driven by the second converter.

8. The steering controlling device according to claim 5,
wherein the means for boosting the power source voltage monitors an input voltage to the first converter or an output voltage from the first converter.

9. The steering controlling device according to claim 5,
wherein the means for boosting the power source voltage controls an output voltage from the first converter to be a predetermined target value.

10. The steering controlling device according to claim 9,
wherein the means for boosting the power source voltage controls the boosted voltage to be a predetermined value or less.

11. The steering controlling device according to claim 8,
wherein the means for boosting the power source voltage stops a first boost operation when the first converter is judged abnormal.

12. The steering controlling device according to claim 8,
wherein the means for boosting the power source voltage stops an application of a current to the motor when the first converter is judged abnormal.

13. The steering controlling device according to claim 8,
wherein the power source is connected to the motor driving circuit through a switching means, and the means for boosting the power source voltage opens a contact point of the switching means when the first converter is judged abnormal.

14. The steering controlling device according to claim 5,
wherein a duty ratio of driving the switching elements of the bridge circuit is 100% when the first converter is operated to boost the voltage.

15. The steering controlling device according to claim 5,
wherein terminals of diodes forming the first converter are short-circuited when the first converter is not operated to boost the voltage.

16. The steering controlling device according to claim 5,
wherein the diodes forming the first converter are parasitic diodes of MOSFET.

17. The steering controlling device according to claim 5,
wherein the means for boosting the power source voltage controls the electric current of the motor to be a predetermined target value by driving at least one of the first converter and the bridge circuit by pulse.

* * * * *